United States Patent [19]

Rogers et al.

[11] Patent Number: 4,720,935
[45] Date of Patent: Jan. 26, 1988

[54] SOD-GROWING COMPOSITION AND METHOD OF USING IT

[75] Inventors: Richard B. Rogers, Brentwood; Robert D. Goodrich, Camarillo, both of Calif.

[73] Assignee: Pacific Sod, Ltd., Camarillo, Calif.

[21] Appl. No.: 876,738

[22] Filed: Jun. 20, 1986

[51] Int. Cl.$^4$ ............................................... A01C 1/04
[52] U.S. Cl. ........................................................ 47/56
[58] Field of Search ...................................... 47/56, 58

[56] References Cited

U.S. PATENT DOCUMENTS

| | | |
|---|---|---|
| 1,978,102 | 10/1934 | Clapp . |
| 3,863,388 | 2/1975 | Loads .................... 47/56 |
| 3,890,739 | 6/1975 | Blackburn . |
| 3,903,816 | 9/1975 | Brem . |
| 3,940,257 | 2/1976 | Sherwin et al. . |
| 4,063,384 | 12/1977 | Warren et al. . |
| 4,063,385 | 12/1977 | Friedberg . |
| 4,067,716 | 1/1978 | Sterrett . |
| 4,154,174 | 5/1979 | Rees, Jr. et al. . |
| 4,232,481 | 11/1980 | Chamoulaud ........................ 47/56 |
| 4,357,780 | 11/1982 | Ball ............................................. 47/56 |

FOREIGN PATENT DOCUMENTS

| | | |
|---|---|---|
| 1126663 | 3/1962 | Fed. Rep. of Germany . |
| 153719 | 8/1985 | Japan ...................................... 47/56 |
| 1290338 | 9/1972 | United Kingdom . |
| 2052234 | 1/1981 | United Kingdom ................... 47/56 |

*Primary Examiner*—Robert E. Bagwill
*Attorney, Agent, or Firm*—Pretty, Schroeder, Brueggemann & Clark

[57] ABSTRACT

A composition particularly adapted for use as a growing medium for grass. The composition, which includes prescribed proportions of water-absorptive wood fiber and non-water-absorptive cellulose particles (preferably rice hulls), is convenient to use and holds vast quantities of water for nourishing the germinating and growing grass plants. The composition's consistency inhibits its formation into an air-impervious sheet, which otherwise could reduce its effectiveness. In addition, when allowed to dry, the composition is extremely light in weight, which makes it easier to handle during harvesting and relatively inexpensive to transport.

18 Claims, No Drawings

4,720,935

SOD-GROWING COMPOSITION AND METHOD OF USING IT

BACKGROUND OF THE INVENTION

This invention relates generally to plant growing media, and, more particularly, to growing media particularly suitable for use in growing sod.

Grass lawns are now commonly produced by growing sod at special sod farms and then harvesting the sod and shipping it via truck to an installation site. There, the sod is laid out on specially-prepared ground, where the grass roots from the sod can grow into the ground to form a secure grass lawn. The sod is typically grown at the sod farm in a medium of soil, with a predetermined soil depth being removed with each harvest. Plastic sheeting is sometimes used to form a barrier that limits the depth of root growth.

A large proportion of the total cost of the sod is attributable to the cost of trucking it to the installation site. This is due in large part to the sod's extremely heavy weight, which sharply limits the amount that can be transported on each truck. It is therefore desirable to utilize a growing medium that is significantly lighter in weight than conventional soil.

There have been several prior attempts to grow sod using lightweight growing compositions as alternatives to soil. The compositions are used by spreading them onto a plastic sheet, which confines root growth to the composition and not the underlying ground. None of these prior attempts is believed to have been entirely successful. The lightweight compositions used in the past are not believed to carry as much water as is possible to carry and are not believed to be as light in weight as is possible. In addition, some lightweight media used in the past have sometimes included components (e.g., crushed conifer bark) that are not readily available in many regions.

It should therefore be appreciated that there is a need for a germinating and growing medium for grass that comprises readily available materials, is convenient to use, and is capable of holding vast quantities of water, yet when dry is light in weight to facilitate its economic transport. The present invention fulfills this need.

SUMMARY OF THE INVENTION

The present invention is embodied in a composition particularly adapted for use in growing sod which holds vast quantities of water, yet when dry is light in weight and therefore convenient to handle and transport. The composition includes predetermined proportions of water-absorptive wood fibers and non-water-absorptive cellulose particles, which are thoroughly mixed together to form a growing composition that has a consistency particularly well-suited for germinating and growing grass. The wood fibers range in length up to about one inch and are interlockable with each other, while the cellulose particles likewise have maximum dimensions of up to about one inch but have smooth exterior surfaces. Because of the presence of the cellulose particles, the composition resists the formation of an air-impervious sheet when spread into a uniform layer, wetted and then dried.

More particularly, the composition of the invention includes 50 to 90 percent by dry weight of the water-absorptive wood fibers and 10 to 50 percent by dry weight of the non-water-absorptive cellulose particles. Each of the cellulose particles has a smooth exterior surface defined substantially entirely by two parallel and closely-spaced surfaces. One such surface is preferably concave, and the other therefore convex, so that the particles function to break up the interlocked wood fibers and thus prevent the formation of a moisture-impervious sheet. The cellulose particles ideally take the form of seed hulls (e.g., rice hulls) or chopped straw.

The grass growing composition of the invention is preferably used by mixing in grass seeds and spreading it in a thin layer on a surface that is generally moisture-impervious, but that drains off excess water. After watering and optional fertilization, and after the grass plants have grown to the extent that their roots are intertwined in the thin growing composition layer, the sod is allowed to dry and then removed from the moisture-impervious surface for stacking on a truck and transport to an installation site. The intertwined roots are sufficiently strong to hold the sod together, and the lack of significant moisture in the growing medium makes the sod extremely light in weight such that increased amounts of sod can be shipped on a single truck.

Other aspects and advantages of the present invention will become apparent from the following description of the preferred embodiment, which illustrates the principles of the invention.

DESCRIPTION OF THE PREFERRED EMBODIMENT

This invention is embodied in a special lightweight growing composition for particular use in growing grass or sod. The composition is used by spreading it with grass seed into a thin layer on a moisture-impervious surface. Watering the layer germinates the grass seeds and the resulting grass roots intertwine themselves in the growing composition, to hold the composition tightly together. When harvested, the growing composition with intertwined grass roots, i.e., the sod, is allowed to dry and is then removed from the moisture-impervious surface for stacking on a truck and transport to an installation site.

In accordance with the invention, the lightweight growing composition consists essentially of about 70 percent by dry weight of water-absorptive wood fibers and about 30 percent by dry weight of substantially non-water-absorptive cellulose particles such as rice hulls. The wood fibers and cellulose particles are thoroughly mixed together to form a medium that can hold vast amounts of water and provide ample nourishment for the grass seed.

The cellulose particles have smooth exterior surfaces and are shaped so as to break up the composition and prevent the interlocked wood fibers from forming a rigid, air-impervious sheet. Without the presence of such cellulose particles, the wood fibers can form themselves into such sheet after wetting and subsequent drying. Such a sheet is undesirable because it can inhibit a rapid growth of the grass plants by preventing air from reaching the germinating seeds and by trapping moisture at the layer's bottom.

The cellulose particles preferably consist essentially of rice hulls, which are the outer coverings, or husks, of rice grains. It will be appreciated, however, that other smooth-surfaced cellulose particles can work equally well. Other smooth seed hulls, as well as straw, are considered suitable. The choice of a suitable cellulose particle depends in large part on the kinds of materials available in the particular region in question. Ideally, the selected material has a smooth exterior surface, which helps keep the composition from sticking together. In addition, the particles are preferably defined by a generally thin wall, with a convex side and an opposite concave side, the latter of which functions to trap air and thereby further ensure that the composition does not form into an air-impervious sheet.

The best consistency for the composition is provided when the cellulose particles have maximum dimensions of less than about one-half inch. Thus, in some instances, such as when the cellulose particles comprise straw, the particles must be chopped to this desired size.

The wood fibers included in the composition of the invention are a papermill byproduct and have been commonly used in the past for mulching and soil erosion control. In such uses, the fibers are sprayed onto a hillside or other area to be covered. Suitable wood fibers for use in practicing the invention include Hydro Mulch fibers sold by Conwed, Spra-Mulch fibers sold by Pacific Wood Fibers, and Silva-Fiber fibers sold by Weyerhaeuser.

As previously mentioned, the wood fiber and cellulose particles comprising the composition of the invention are preferably mixed together in dry weight proportions of 70 percent and 30 percent, respectively. These preferred percentages can be modified to a limited extent without significantly reducing the composition's effectiveness. In particular, the wood fiber percentage can vary from 50 to 90 percent by dry weight, and the cellulose particle percentage can correspondingly vary from 10 to 50 percent by dry weight. Increasing the relative proportion of wood fibers increases the amount of water that the composition can hold, so that the germinating and growing grass need not be watered as often. Increasing the wood fiber percentage beyond the 90 percent level should be avoided, however, because it can reduce the grass' growth rate and can lead to the undesired formation of an air-impervious sheet, as described above.

The composition of the invention is used by mixing it with grass seed and spreading it into a thin (e.g., one inch) layer on a level, moisture-impervious surface. This surface is preferably formed by level ground covered by plastic sheet. Spaced apertures can be placed in the plastic sheet to ensure adequate drainage of excess water. The layer is periodically watered by an appropriate amount to germinate the seeds. Suitable fertilizers may of course be used to supplement the nourishment provided by the water, wood fibers, and cellulose particles.

After a period of time, the grass plants grow to the point where their roots are intertwined in the growing composition to hold the composition rigidly together. The roots are confined to the composition because of the underlying moisture-impervious sheet. The sod can be harvested at this time for transport to an installation site. The composition is allowed to dry prior to harvesting, so that its weight is reduced as much as possible for the transport. This maximizes the amount of sod that can be carried by any one truck and thus significantly reduces the sod's ultimate cost.

It should be appreciated from the foregoing description that the present invention provides an improved plant-growing composition that is particularly well-suited for use in growing sod. The composition, which includes prescribed proportions of water-absorptive wood fiber and non-water-absorptive cellulose particles, is convenient to use and holds vast quantities of water for nourishing the germinating and growing grass plants. In addition, when allowed to dry, the composition is extremely light in weight, which makes it easier to handle during harvesting and relatively inexpensive to transport.

Although the invention has been described in detail with reference to the presently-preferred embodiment, it will be appreciated by those skilled in the art that various modifications can be made without departing from the invention. Accordingly, the invention is limited only by the following claims.

We claim:

1. A composition particularly adapted for use as a germinating and growing medium for grass, comprising:
   50 to 90 percent by dry weight of water-absorptive wood fibers ranging in length up to about one inch; and
   10 to 50 percent by dry weight of substantially non-water-absorptive cellulose particles having smooth exterior surfaces and maximum dimensions of less than about one inch;
   wherein the wood fibers and cellulose particles are thoroughly mixed together to form a germinating and growing medium for grass that resists formation of an air-impervious sheet when spread in a uniform layer, wetted and then dried.

2. A composition as defined in claim 1, wherein:
   substantially the entire smooth exterior surface of each cellulose particle is defined by two substantially parallel surfaces; and
   each cellulose particle is elongated and less than about one-half inch in length.

3. A composition as defined in claim 2, wherein one surface of each of the cellulose particles is concave and functions to trap air and thereby inhibit interlocking of the wood fibers.

4. A composition as defined in claim 1, wherein the cellulose particles include seed hulls.

5. A composition as defined in claim 1, wherein the cellulose particles include rice hulls.

6. A composition as defined in claim 1, and further including a plurality of grass plants growing in the mixture of wood fibers and cellulose particles, with their roots intertwined in a network that binds the composition together.

7. A composition as defined in claim 1, wherein the wood fibers comprise 70 percent by dry weight of the composition and the cellulose particles comprise 30 percent by dry weight of the composition.

8. A process for growing sod comprising steps of:
   placing a moisture-impervious sheet on a substantially flat and level surface;
   mixing together a composition including 50 to 90 percent by dry weight of water-absorptive, interlockable wood fibers ranging up to about one inch in length and 10 to 50 percent by dry weight of substantially non-water-absorptive cellulose particles, each having a smooth exterior surface and a maximum dimension of less than about one inch;
   spreading the composition formed in the step of mixing onto the moisture-impervious sheet to form a uniform growing medium; and
   depositing grass seeds in the uniform growing medium formed in the step of spreading and watering the medium such that the grass seeds germinate and grow to form a network of roots that bind the medium together, thereby forming sod.

9. A process as defined in claim 8, wherein:
substantially the entire exterior surface of each cellulose particle used in the step of mixing is defined by two substantially parallel, closely-spaced surfaces; and
each cellulose particle used in the step of mixing is elongated and less than about one-half inch in length.

10. A process as defined in claim 9, wherein one surface of each of the cellulose particles used in the step of mixing is concave and functions to trap air and thereby inhibit interlocking of the wood fibers.

11. A process as defined in claim 8, wherein the cellulose particles used in the step of mixing consist essentially of rice hulls.

12. A process as defined in claim 8, wherein the composition produced in the step of mixing consists essentially of about 70 percent by dry weight of the wood fibers and about 30 percent by dry weight of the cellulose particles.

13. A composition particularly adapted for use as a germinating and growing medium for grass, consisting essentially of:
about 70 percent by dry weight of water-absorptive wood fibers ranging in length up to about one-half inch; and
about 30 percent by dry weight of substantially non-water-absorptive cellulose particles, each having a maximum dimension of less than about one-half inch and each having a smooth exterior surface defined by two substantially parallel and closely-spaced surfaces;
wherein the wood fibers and cellulose particles are thoroughly mixed together to form a germinating and growing medium for grass that resists formation of an air-impervious sheet when spread in a uniform layer, wetted and then dried.

14. A composition as defined in claim 13, wherein the cellulose particles consist essentially of seed hulls.

15. A composition as defined in claim 13, wherein the cellulose particles consist essentially of rice hulls.

16. Grass sod comprising:
a thin layer of a growing composition consisting essentially of
about 70 percent by dry weight of water-absorptive wood fibers ranging in length up to about one-half inch, and
about 30 percent by dry weight of substantially non-water-absorptive cellulose particles, each having a maximum dimension of less than about one-half inch and each having a smooth exterior surface defined by two substantially parallel and closely-spaced surfaces,
wherein the wood fibers and cellulose particles are thoroughly mixed together and the thin growing composition layer resists formation of an air-impervious sheet when wetted and then dried; and
a plurality of grass plants growing in the growing composition layer, with the roots of the plants intertwined in a network that binds the composition together.

17. Grass sod as defined in claim 16, wherein the cellulose particles of the growing composition consist essentially of seed hulls.

18. Grass sod as defined in claim 16, wherein the cellulose particles of the growing composition consist essentially of rice hulls.

* * * * *